United States Patent
Ito et al.

(10) Patent No.: US 10,756,571 B2
(45) Date of Patent: Aug. 25, 2020

(54) SYSTEM AND METHOD FOR STABILIZING POWER SYSTEM

(71) Applicant: Hitachi, Ltd., Chiyoda-ku, Tokyo (JP)

(72) Inventors: Tomomichi Ito, Tokyo (JP); Akira Kikuchi, Tokyo (JP); Masahiro Watanabe, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 142 days.

(21) Appl. No.: 16/307,395

(22) PCT Filed: Jul. 11, 2016

(86) PCT No.: PCT/JP2016/070380
§ 371 (c)(1),
(2) Date: Dec. 5, 2018

(87) PCT Pub. No.: WO2018/011843
PCT Pub. Date: Jan. 18, 2018

(65) Prior Publication Data
US 2019/0305590 A1    Oct. 3, 2019

(51) Int. Cl.
*H02J 13/00* (2006.01)
*H02H 1/00* (2006.01)
(Continued)

(52) U.S. Cl.
CPC ....... *H02J 13/0017* (2013.01); *H02H 1/0007* (2013.01); *H02H 1/0092* (2013.01);
(Continued)

(58) Field of Classification Search
CPC .......... H02J 13/0017; H02J 3/24; H02J 3/381; H02H 3/02; H02H 1/0007; H02H 1/0092; H02H 7/20; H02H 3/26
(Continued)

(56) References Cited

U.S. PATENT DOCUMENTS

| | | | | |
|---|---|---|---|---|
| 5,703,791 A | * | 12/1997 | Amano | H02J 3/24 322/20 |
| 2015/0194966 A1 | * | 7/2015 | Kimura | H02J 3/381 700/287 |
| 2017/0045558 A1 | | 2/2017 | Kuroda et al. | |

FOREIGN PATENT DOCUMENTS

| | | |
|---|---|---|
| JP | 2001-333549 A | 11/2001 |
| JP | 2003-319559 A | 11/2003 |

(Continued)

OTHER PUBLICATIONS

Extended European Search Report issued in European Application No. 16908747.5 dated Feb. 4, 2020 (six (6) pages).

(Continued)

*Primary Examiner* — Dharti H Patel
(74) *Attorney, Agent, or Firm* — Crowell & Moring LLP

(57) ABSTRACT

Providing a power system and a method for stabilizing a system, in which the number of generators to be disconnected is reduced to narrow an area influenced by a grid fault in the case where the reliability of the state estimation calculation is judged to be high. The power system stabilizing method applied to a power system configured to include a plurality of feeders including circuit breakers, a plurality of nodes, a plurality of generators, and a plurality of loads, in which method: a protection relay detects a grid fault by using an output from a first sensor installed close to the circuit breaker, thereby opening-controlling the circuit breaker, and the circuit breaker is opening-controlled by a power system stabilization output; a state estimation value of a power system obtained by using the first sensor output and a state detection value, of the power system, containing information associated with measurement time measured in the power system are compared with each other to judge reliability of the state estimation value; the circuit breaker which is to be newly cut off from a viewpoint of power (Continued)

system stability after occurrence of a grid fault at a supposed grid fault point of the power system is stored, and the circuit breaker which is to be cut off every reliability judgment result of the state estimation value is stored; and at the time of occurrence of a grid fault of the power system, a turn-off command for the circuit breaker which is selected in response to the reliability judgment result of the state estimation value so as to be newly cut off is set as the power system stabilization output.

20 Claims, 9 Drawing Sheets

(51) Int. Cl.
  *H02H 7/20* (2006.01)
  *H02J 3/38* (2006.01)
  *H02H 3/02* (2006.01)
  *H02J 3/24* (2006.01)

(52) U.S. Cl.
  CPC .............. *H02H 3/02* (2013.01); *H02H 7/20* (2013.01); *H02J 3/24* (2013.01); *H02J 3/381* (2013.01)

(58) Field of Classification Search
  USPC .......................................................... 361/42
  See application file for complete search history.

(56) References Cited

FOREIGN PATENT DOCUMENTS

| JP | 2005-94831 A | 4/2005 |
| JP | 2011-115003 A | 6/2011 |
| JP | 2012-239307 A | 12/2012 |

OTHER PUBLICATIONS

International Search Report (PCT/ISA/210) issued in PCT Application No. PCT/JP2016/070380 dated Sep. 20, 2016 with English translation (five (5) pages).

Japanese-language Written Opinion (PCT/ISA/237) issued in PCT Application No. PCT/JP2016/070380 dated Sep. 20, 2016 (three (3) pages).

Horii et al., "Power System Technologies for Reliable Supply of Electric Power and Wide-area Grids," Hitachi Review, 2013, pp. 53-59, vol. 62, No. 1 with English translation (13 pages).

* cited by examiner

SYSTEM AND METHOD FOR STABILIZING POWER SYSTEM

TECHNICAL FIELD

The present invention relates to a control system and a method for stabilizing a system for realizing system stabilization at the time of a grid fault. In particular, the present invention relates to a system and a method for stabilizing a power system for narrowing an influence range of grid faults by reducing the number of generators which is limited in the case where reliability of power state estimation calculation is high.

BACKGROUND ART

The power system is generally configured to include a plurality of generators with rotors, transmission and distribution lines, loads, a voltage/current sensor for detecting a voltage and a power flow of a transmission and distribution network, a protection relay, a circuit breaker for turning ON/disconnecting a generator and a transmission line for the transmission and distribution network in operation by a switching operation, and a power system stabilizing system for controlling the circuit breaker by receiving as inputs thereof operation signals of the voltage/current sensor and the protection relay. As a result, when a ground fault or a line-to-line short circuit fault has occurred in the load or the transmission and distribution lines, the protection relay is activated due to an overcurrent detected by the current sensor to carry out a circuit breaker opening operation for removing fault point from the grid.

When the system voltage gets lower due to the grid fault, an active power which can be supplied from the generator to the load is reduced. When the active power which is to be transmitted is reduced, a breaking torque in the generators' rotor is also reduced. On one hand, since the adjustment of a mechanical input of the generator is accompanied by the delay, the mechanical input exceeds the breaking torque, and as a result, for a period of time required for the removal of the grid fault, rotating speed of the rotors in the generators increases.

On the other hand, when the grid fault is removed by the opening operation of the circuit breaker, since the voltage of the transmission and distribution line returns, the active power which is to be supplied to the transmission and distribution line returns. As a result, the breaking torque returns. Due to the returning of the breaking torque, the angular frequency of the rotor is reduced to settle into an angular frequency corresponding to a commercial frequency.

However, in the case where the voltage drop during grid fault is remarkable, or in the case where a period of time up to the disconnection of the fault point from the grid is long, the rotors are accelerated so much that the generator can have step-out in some cases.

For the stabilization of the rotor speed after the grid fault, the sufficient electrical load is required. For this reason, for the purpose of avoiding the major power outage, there is adopted a technique in which an electrical load of a generator group for which an interconnection state with the system is maintained by disconnecting some generators from the system is increased to keep the stability of whole system.

As described above, the generator stability (transient stability) after the fault depends on the terminal voltage of the generators, and the duration of grid fault. Therefore, the power system stabilizing system is previously provided with a circuit breaker opening table (hereinafter referred to as a control table) in which a portion and a form of the generation of the grid fault are supposed. Thus, after the generator output and the power flow state just before the grid fault are grasped, at the time of the generation of the grid fault, the power system stabilizing system receives as an input thereto operation information associated with the protection relay, and speedily opens the corresponding circuit breaker in accordance with the table described above, thereby preventing wide-area power outage.

Patent Document 1 discloses a control technique with which for the opening of the circuit breaker, the generator transient stability is evaluated by using both off-line information and on-line information, thereby disconnecting the generator. In addition, Non-Patent Document 1 discloses a technique with which state estimation calculation for estimating a state of the power system through calculation from limited sensor information is carried out, thereby controlling the generator disconnection by using the calculation result.

PRIOR ART DOCUMENT

Patent Document

Patent Document 1: JP-2005-94831-A

Non-Patent Document

Non-Patent Document 1: "Power System Technologies for Reliable Supply of Electric Power and Wide-area Grids," HITACHI REVIEW, Vol. 62, No. 1, 2013

SUMMARY OF THE INVENTION

Problem to be Solved by the Invention

With the techniques described in Patent Document 1 and Non-Patent Document 1, both of them are described on the assumption that the system state can be accurately grasped. However, the time delay due to communication congestion is present in the power flow information acquired with the voltage/current sensor, and the delay time is also changed. In addition, an amount of state detected with the failed sensor is not proper in some cases.

In addition, since the voltage/power flow information is collected in the control system through the communication, the time delay is present and thus the simultaneity is not also secured. In recent years, sample time of the detection information has been able to be confirmed by introduction of a Phase Measuring Unit (PMU) for realizing the same time state sampling by utilization of a Global Positioning System (GPS). However, the number of PMUs enough to grasp the state of the entire system is not necessarily installed. It should be noted that the PMU is a unit for adding absolute time obtained from the GPS to the measurement information, in the power system, such as the phase, the voltage, and the current to measure the measurement information as the time-series measurement information in real time.

In addition, when the power system stabilizing system receives as an input thereof the voltage/power flow information accompanied by the changing time delay and containing therein the incorrect signal due to the failure or the like, and carries out the state estimation calculation for compensating for the shortage measurement information, the state estimation calculation does not converge, or the reliability is largely reduced in some cases. Under the condition in which the reliability of the state estimation calculation is low, for the purpose of avoiding the major power outage at the time of the generation of the grid fault, the control table with which the transient stability of the generator can be given a sufficient margin has no choice but to be used. The control table given the margin is used, resulting in that at the time of grid fault, a large number of generators are disconnected, and the influence range of grid faults becomes a wide area.

In the light of the foregoing, the present invention provide a power system and a method for stabilizing a system with which a control table which, at the time of a grid fault, is referred in response to calculation reliability of state estimation calculation is changed, resulting in that in the case where the reliability of the state estimation calculation is judged to be high, the number of generators to be disconnected is reduced to narrow a power failure area.

Means for Solving the Problem

From the foregoing, according to the present invention, there is provided a power system stabilizing system applied to a power system configured to include a plurality of feeders including circuit breakers, a plurality of nodes, a plurality of generators, and a plurality of loads. The power system stabilizing system includes: a first interface portion for receiving as inputs thereof, every plurality of circuit breakers, information associated with a voltage and a power flow close to the plurality of circuit breakers concerned, and information associated with a protection relay for deciding an opening operation of the plurality of circuit breakers; a second interface portion for receiving as an input thereof the formation associated with a voltage and a power flow containing information associated with measurement time measured in the power system; state estimation calculating means for carrying out power flow state estimation calculation for the power system by using measurement information, associated with the voltage and the power flow, from the first interface; a grid fault judging means for judging a grid fault from the information associated with a protection relay from the first interface portion; circuit breaker opening command computing means for computing and outputting a breaker opening command by using information in a control table; reliability judging means for comparing power flow measurement information from the second interface portion, and power flow estimation information from the state estimation calculating means with each other to judge reliability of the state estimation calculation in the state estimation calculation means; and the control table configured every judgment result of the reliability judging means, the circuit breaker which is to be newly opening-manipulated from a viewpoint of ensuring of power system stability after the grid fault being decided in the control table, wherein the circuit breaker opening command computing means gives a circuit breaker opening command for the circuit breaker by using the information in the control table selected in response to a judgment result of the reliability judging means.

In addition, according to the present invention, there is provided a power system stabilizing method applied to a power system configured to include a plurality of feeders including circuit breakers, a plurality of nodes, a plurality of generators, and a plurality of loads. The power system stabilizing method includes: a first step of obtaining as inputs thereof, every plurality of circuit breakers, information associated with a voltage and a power flow close to the plurality of circuit breakers concerned, and information associated with a protection relay for deciding an opening operation of the plurality of circuit breakers; a second step of obtaining as an input thereof information associated with a voltage and a power flow containing information associated with measurement time measured in the power system; a third step of carrying out power flow state estimation calculation for the power system by using measurement information, associated with the voltage and the power flow, in the first step; a fourth step of judging a grid fault from the information associated with the protection relay in the first step; a sixth step of computing and outputting a breaker opening command by using information associated with a fifth step; a seventh step of comparing power flow measurement information in the second step, and power flow estimation information in the third step with each other to judge reliability of the state estimation calculation in the third step; and the fifth step, configured every judgment result in the seventh step, of deciding the circuit breaker which is to be newly opening-manipulated from a viewpoint of ensuring of power system stability after grid fault, wherein the sixth step gives the circuit breaker opening instruction for the circuit breaker, by using the information in the fifth step, selected in response to a judgment result in the seventh step.

In addition, according to the present invention, there is a power system stabilizing method applied to a power system configured to include a plurality of feeders including circuit breakers, a plurality of nodes, a plurality of generators, and a plurality of loads, wherein a protection relay detects a grid fault by using an output from a first sensor installed close to the circuit breaker, thereby opening-controlling the circuit breaker, and the circuit breaker is opening-controlled by a power system stabilization output; a state estimation value of a power system obtained by using the first sensor output and a state detection value, of the power system, containing information associated with measurement time measured in the power system are compared with each other to judge reliability of the state estimation value; the circuit breaker which is to be newly cut off from a viewpoint of power system stability after grid fault at a supposed fault point of the power system is stored, and the circuit breaker which is to be cut off every reliability judgment result of the state estimation value is stored; and at the time of the grid fault, a turn-off command for the circuit breaker which is selected in response to the reliability judgment result of the state estimation value so as to be newly cut off is set as the power system stabilization output.

Effect of the Invention

According to the present invention, in the case where the reliability of the state estimation calculation of the power system stabilizing system is judged to be high, the influence range of the grid fault at the time of the grid fault can be narrowed.

MODES FOR CARRYING OUT THE INVENTION

Hereinafter, embodiments of the present invention will be described in detail with reference to the drawings.

Embodiment 1

Figure 6:
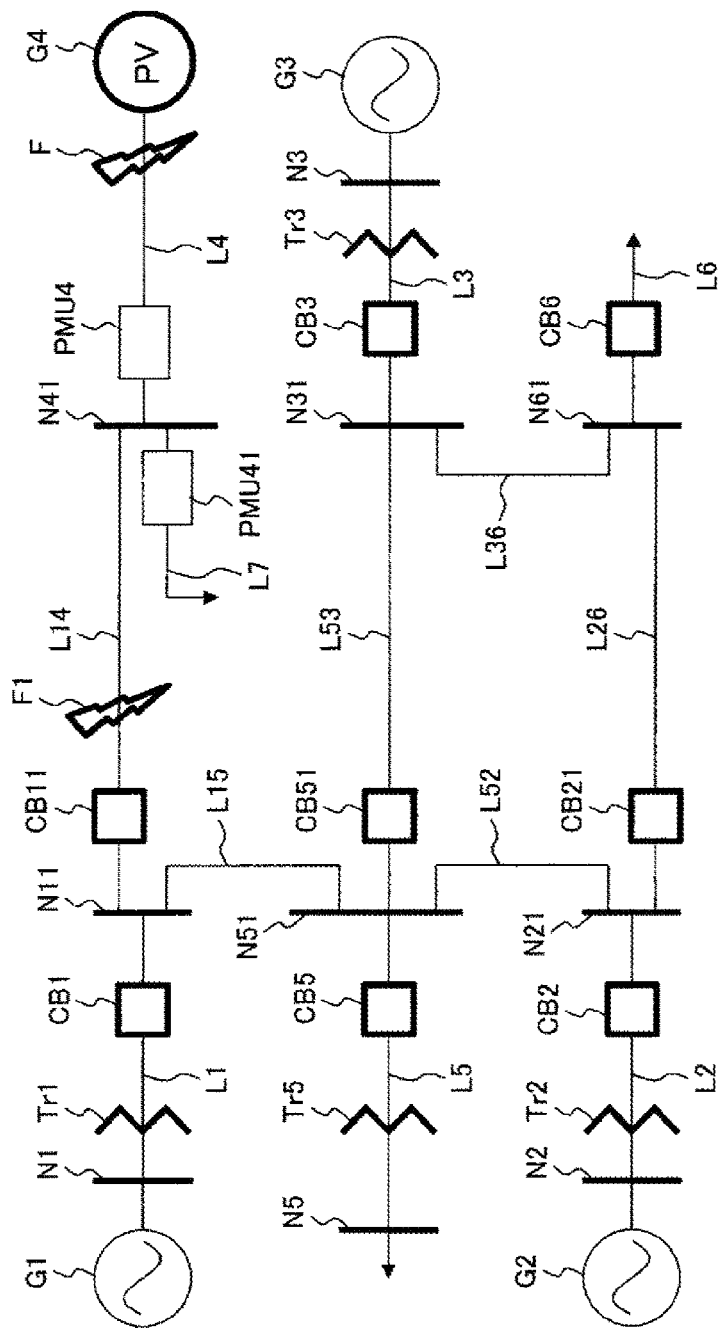
FIG. 6 is a block diagram depicting a schematic example of a power system to which the power system stabilizing system of the present invention is applied.

FIG. 6 depicts a schematic view of a power system to which a power system stabilizing system of the present invention is applied.

A typical power system depicted in FIG. 6 is configured to include a plurality of generators with rotors G (G1, G2, G3), a photovoltaic power generation system G4, transformers Tr (Tr1, Tr2, Tr3, Tr5), circuit breakers CB with sensors (CB1, CB11, CB2, CB21, CB3, CB5, CB51, CB6), a plurality of nodes N (N1, N2, N3, N5, N11, N21, N31, N41, N51, N61), and feeders L (L1, L2, L3, L4, L5, L6, L7, L14, L15, L53, L52, L36, L26) through which the nodes N are connected to one another. In this power system, loads are respectively connected to the nodes N41, N5, and N61, and the powers which are transmitted from the group of generators G1, G2, G3 described above, and the photovoltaic power generation system G4 are sent to the loads to be consumed therein.

The vicinity of the circuit breaker CB with the sensor is provided with current and voltage sensors, and a protection relay. The protection relay detects a grid fault based on the information associated with the current and the voltage, thereby disconnection(release)-controlling the circuit breaker CB with the sensor concerned. In case of FIG. 6, it is supposed that a grid fault F has occurred in the vicinity of the photovoltaic power generation system G4. Normally, the disconnection control by the circuit breaker CB11 arranged in a position closest to a fault point shall be carried out.

Figure 1:
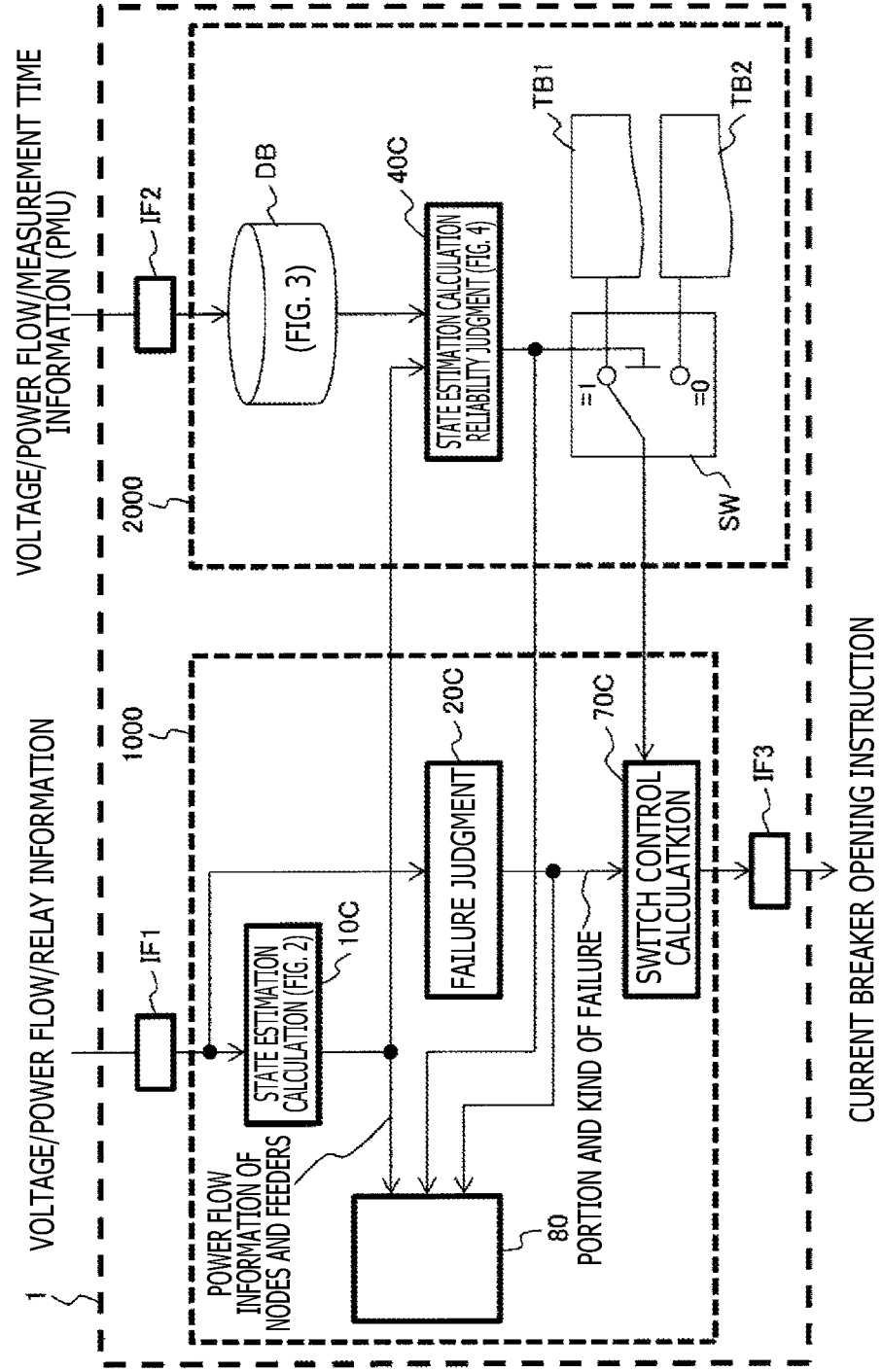
FIG. 1 is a block diagram depicting an example of a configuration of a power system stabilizing system according to Embodiment 1 of the present invention.

Information associated with the voltage/power flow (active power and reactive power) detected in the vicinity of the circuit breaker CB with the sensor, and operation information associated with a protection relay with which the circuit breaker CB is provided are transmitted to a basic power system protecting system portion 1000 of the power system stabilizing system 1 FIG. 1 according to Embodiment 1 of the present invention through a first network (not depicted). In addition, a Phase Measuring Unit (PMU) 4 and a PMU41 are installed as PMUs between the node N41 and the photovoltaic power generation system G4, and between the node N41 and the load, respectively. These sensed values are transmitted to a PMU correction calculating portion 2000 of the power system stabilizing system 1 of FIG. 1 through a second network (not depicted).

FIG. 1 is a block diagram depicting an example of a configuration of a power system stabilizing system according to Embodiment 1 of the present invention. The power system stabilizing system 1 is roughly configured to include a basic power system protecting system portion 1000 and a PMU correction calculating portion 2000. The basic power system protecting system portion 1000 is given information associated with a voltage/power flow (active power and reactive power) detected in the vicinity of a circuit breaker CB with a sensor, and operation information associated with a protection relay with which the circuit breaker CB described above is provided through from the first network described above to a first interface portion IF1. In addition, the PMU correction calculating portion 2000 is given detection values of the PMU4 and the PMU41 through from the second network described above to a second interface portion IF2.

Although details will be described later, the basic power system protecting system portion 1000 estimates a state of the power system from current, voltage information in the vicinity of the circuit breaker CB with the sensor, which is received as an input thereof through the interface portion IF1, and judges a grid fault from protection relay information associated with the circuit breaker CB with the sensor. In addition, the basic power system protecting system portion 1000 carries out generator control calculation using a control table selected from both a grid fault judgment result and a state estimation result, and outputs a generator control calculation result to each of the circuit breakers CB through an interface portion IF3. The PMU correction calculating portion 2000 evaluates the reliability of the state estimation calculation described above from the information associated with the PMU, and carries out the PMU correction calculation with which a control table referred in the generator control calculation is switched depending on the reliability evaluation result.

It should be noted that the power system stabilizing system 1 is provided with a display device 80, and displays the calculation result and the reliability calculation result in the basic power system protecting system portion 1000 on a screen of the display device 80. The display device 80 enables the state estimation result and the state estimation calculation reliability judgment result to be viewed by an operator.

The basic power system protecting system portion 1000 will be hereinafter described in detail.

Figure 2:
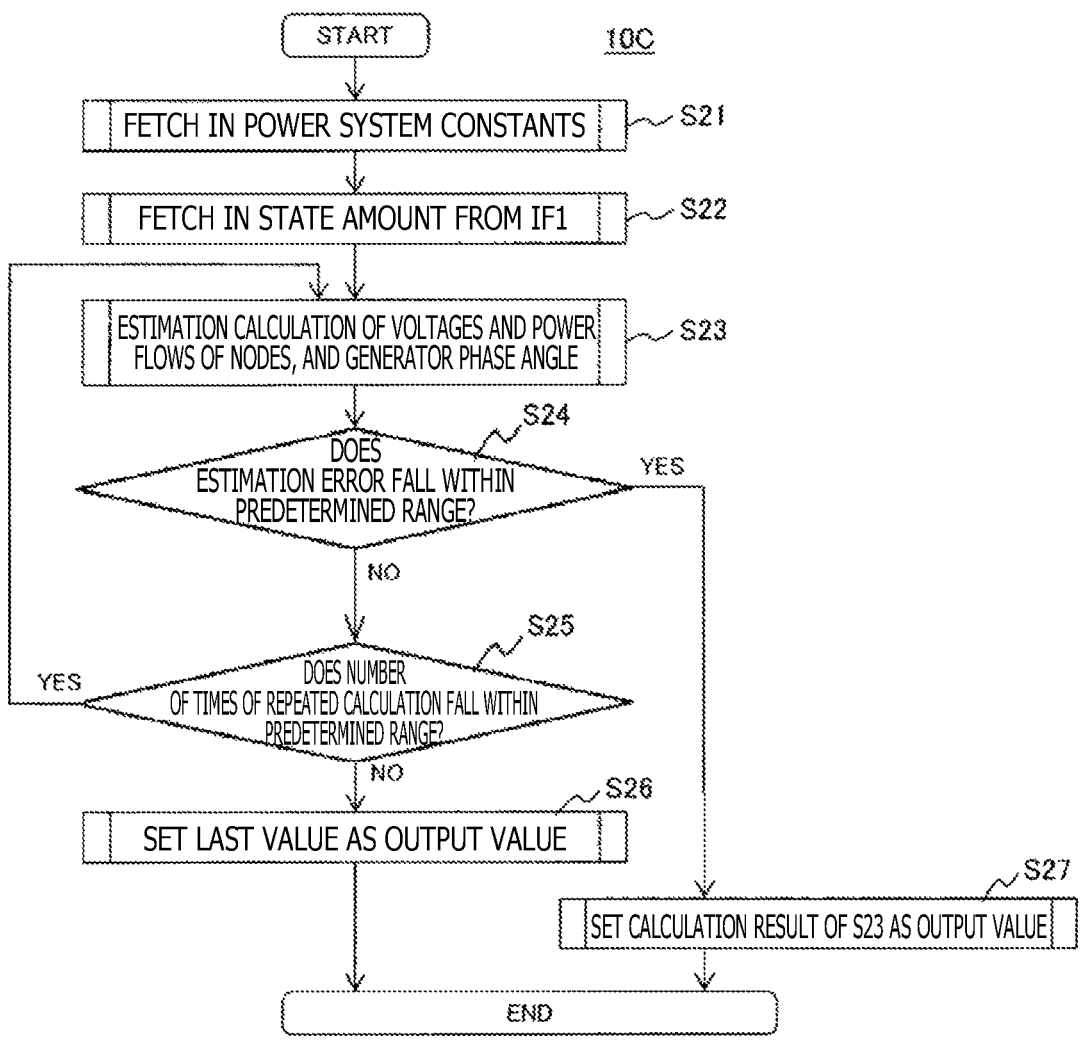
FIG. 2 is a flow chart depicting calculation contents of a state estimation calculating unit 10C.

The voltage/power flow/protection relay operation information is acquired from the interface portion IF1. Of these pieces of information, the voltage/power flow information is given to the state estimation calculating unit 10C. In the state estimation calculation in the state estimation calculating unit 10C, the calculation depicted in FIG. 2 is carried out, thereby computing the voltage/correction in each of the nodes N, and a phase angle of the voltage appears at the stator terminal of generator G. As a result, the power flow information associated with the nodes (bus), and the feeder (power transmission line L) is obtained.

FIG. 2 depicts a flow chart depicting calculation contents of the state estimation calculating unit 10C. A configuration of FIG. 2 will now be described. In first processing Step S21 of FIG. 2, system constants such as impedance of each of the feeders L (L1, L2, L3, L4, L5, L6, L7, L14, L15, L53, L52, L36, L26), and the impedance of each of the generators with rotors G (G1, G2, G3) which are previously inputted to the basic power system protecting system portion 1000 are fetched in for the state estimation calculation. In next processing Step S22, the voltage/power flow information is inputted as numerical data of state variables from the interface IF1.

In processing Step S23, the estimation of the voltage/power flow of each of the nodes, and the generator phase angle is carried out by using the numerical data of state variables obtained in processing Step S22. Here, in the state estimation calculation, repeated calculation is carried out on the assumption that noises following a normal distribution are superimposed on the sensor.

In processing Step S24, it is judged whether or not an estimation error contained in the estimation values of the voltage/power flow about each of the nodes, and the phase angle of the generator falls within a first predetermined range. If the estimation value falls within the first predetermined range, then, in processing Step S27, the result computed in Step S23 is judged to be a proper amount of state, and is outputted to the grid fault judging unit 20C.

In the case where the estimation error described above exceeds beyond the first predetermined range, the processing proceeds to processing Step S25, and it is judged whether or not the number of times of the repeated calculation is equal to or lower than the first predetermined number of times. In the case where the number of times of the repeated calculation is equal to or lower than the first predetermined number of times, the processing is returned back to processing Step S23, and the state estimation calculation is carried out again. When the estimation error about the estimation value obtained from the re-state estimation calculation falls within the first predetermined range, the value at that time is judged to be the amount of proper state from processing Step S27, and is outputted to the failure judging unit 20C.

On the other hand, in the case where the number of times of the re-state estimation calculation exceeds the first predetermined number of times, processing Step S26 is regarded as a failure in convergence, and the last output value of the state estimation calculating unit 10C is outputted as the current output value to the failure judging unit 20C.

It should be noted that since the state estimation needs to be calculated in real time, the repeated number of times is desirably set in such a way that the state estimation calculation can be ended for several minutes. In addition, the output from the state estimation calculating unit 10C is outputted to each of the display device 80, and the state estimation calculation reliability judging unit 40C within the PMU correction calculating portion 2000 which will be described later. In such a manner, in the state estimation calculation of FIG. 2, the case where the estimation calculation converges and the case where the estimation calculation does not converge are distinguished from each other, thereby outputting the state estimation calculation result.

Of the voltage/power flow/protection relay operation information obtained from the interface portion IF1 of the basic power system protecting system portion 1000, the remaining protection relay operation information is given to the grid fault judging unit 20C. The grid fault judging unit 20C receives as an input thereof the protection relay operation information from the interface portion IF1, estimates a type, location, and the impact of the grid fault, and outputs the estimation result as grid fault information to the switch control calculating unit 70C. It should be noted that the type of the grid fault means the fault occurring phases, line-to line short circuit or grounding fault, the grid fault location means a point of grid fault (distinction of the power transmission lines), and the impact, for example, means a depth of the voltage dip, an peak value of fault current, and the like.

The switch control calculating unit 70C computes a circuit breaker opening command by referring to the fault information computed by the grid fault judging unit 20C, and the control table which will be described later, and transmits the opening instruction to the corresponding circuit breaker CB through the interface IF3.

It should be noted that for the circuit breaker in the power system, the opening operation is controlled by sensors for the voltage and the current, and the protection relay which are provided in the vicinity of the circuit breaker, and the opening control is carried out in accordance with the judgment from information in the vicinities of the individual circuit breakers. On the other hand, the opening command for the circuit breaker which is given from the switch control calculating unit 70C can be said as a second opening measure decided from a viewpoint of the secure of the stability of the entire power system.

Next, a description will be given with respect to the PMU correction calculating portion 2000 as a main point of the present invention with reference to FIG. 3 to FIG. 5.

Figure 3:
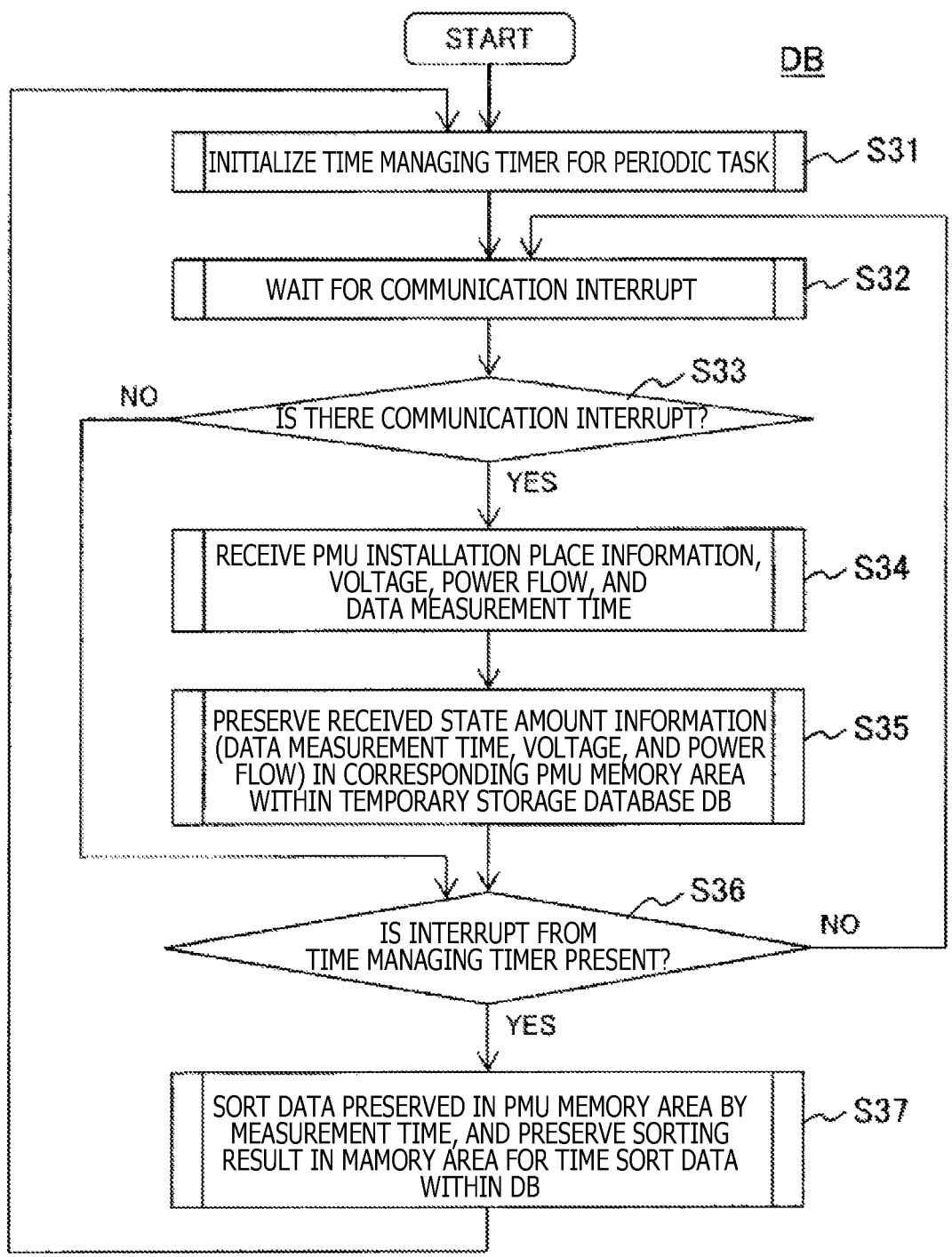
FIG. 3 is a flow chart depicting simultaneity ensuring process for data detected in PMU4, PMU41.

Firstly, FIG. 3 is a flow chart depicting the simultaneity ensuring processing of the data detected in the PMU4, the PMU41. This calculation is calculation which is carried out during the accommodation of the data in the database DB of FIG. 1 to store therein the data.

The calculation of FIG. 3 is realized by a periodic task. By adopting the periodic task, the simultaneity ensuring processing for the information obtained from the PMU4, the PMU41 can be updated for a given period of time. It should be noted that although in Embodiment 1, the periodic task is described, the scheduled update of the simultaneity ensuring processing described above is not necessarily required in realizing the reliability evaluation of the state estimation calculation using the PMU. For this reason, although event driven calculation with a communication outage as an interrupt signal may be available, the following description of Embodiment 1 of the present invention will be given on the assumption of the periodic task.

In first processing Step S31 of FIG. 3, a timer for managing a period of the periodic task is initialized. In processing Step S32, the communication interrupt, from the PMU, which is inputted to the interface IF2 through a communication network (not depicted) is accepted. In processing Step S33, the interrupt from the PMU is checked. If there is the interrupt, then, the processing proceeds to processing Step S34, while if there is no interrupt, the processing proceeds to processing Step S36.

In the case where there is the interrupt by the PMU, in processing Step S34, PMU installation place information, the information associated with the voltage and the power flow, and the information associated with the time when these pieces of information are detected are received from the PMU. The information received in processing Step S34 is preserved within the corresponding PMU memory area of the database DB in processing Step S35.

In processing Step S36, it is judged whether an interrupt from the time managing timer for carrying out the time management of the periodic task is present or absent. In the case where the interrupt is absent, it is judged that the processing time of the periodic task un-elapses, and the processing is returned back to processing Step S32, and a new interrupt from the PMU is waited for.

In the case where in processing Step S36, the interrupt from the time managing timer is confirmed, pieces of information of the PMU held in the PMU memory area are sorted by the measurement time, and a sorting result is held in a memory area for sorted data within the database DB. By executing this processing, the PMU data can be arranged every data sampled at the same hour.

Returning back to FIG. 1, the state estimation calculation reliability judging unit 40C within the PMU correction calculating portion 2000 receives as an input thereof both an input from the state estimation calculating unit 10C of the basic power system protecting system portion 1000, and an output from the database DB. Then, in the case where the reliability of the state estimation calculation is judged to be high, the state estimation calculation reliability judging unit 40C outputs "0." In the case where the reliability of the state estimation calculation is judged to be low, the state estimation calculation reliability judging unit 40C outputs "1." Such an output is outputted to a change-over switch SW.

The change-over switch SW receives as inputs thereof a control table TB1, a control table TB2, and an output from the reliability judging unit 40C. In this case, the control table TB1 realizes a disconnection operation with which although the number of generations which are disconnected at the time of the grid fault is large, that is, there is the margin for the transient stability of the generators remaining in the power system. With the control table TB2, the number of generators which are disconnected at the time of the grid fault is small. Then, the change-over switch SW outputs the control table TB1 to the switch control calculating unit 70C in the case where the output from the reliability judging unit 40C is "1." On the other hand, the change-over switch SW outputs the control table TB2 to the switch control calculating unit 70C in the case where the output from the reliability judging unit 40C is "0."

A description will now be given with respect to a flow chart depicting the contents of the calculation in the state estimation calculation reliability judging unit 40C with reference to FIG. 4.

The power system stabilizing system 1 according to Embodiment 1 of the present invention computes a squared value of a difference between the state estimation result of the main node, and the amount of state of the node which is detected in the PMU. When a maximum value of the squared value is equal to or smaller than a predetermined value, the power system stabilizing system 1 judges that the reliability is high, and when the maximum value of the squared value is equal to or smaller than the predetermined value, the power system stabilizing system 1 judges that the reliability is low. The calculation in the reliability judging unit 40C is event-driven calculation which is carried out at a time point when the state estimation calculation is ended.

In such a manner, in this case, the node N41 in the vicinity of the place where the PMU is installed is set as the main node. With respect to the node N41, the power flow measurement value given by the PMU, and the power flow estimation value given by the state estimation calculating unit 10 are compared with each other. In the present invention, it is thought that the power flow measurement value given by the PMU is a true value, and the power flow estimation value of the state estimation calculating unit 10 obtained from the output of the sensor involving a problem in the error or the time synchronization is evaluated.

Figure 4:
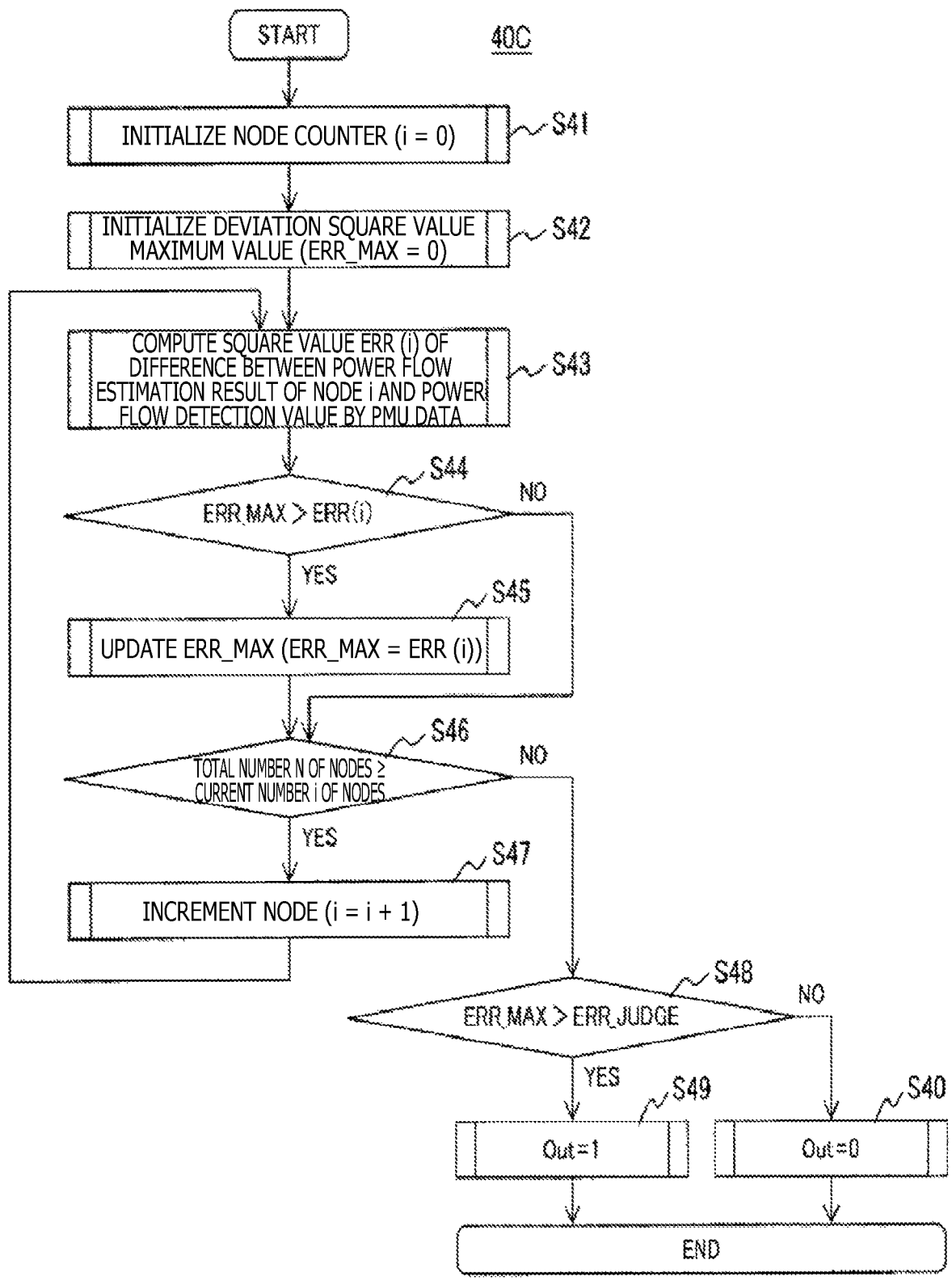
FIG. 4 is a flow chart depicting calculation contents of a state estimation calculation reliability judging unit 40C.

In first processing Step S41 of FIG. 4, the node counter is utilized, and in first processing Step S42 after the initialization, a buffer ERR_MAX for computing a maximum value of a squared power flow deviation as a difference between the power flow estimation value, for example, in the node N41 as the PMU installation node of the state estimation calculating unit 10C, and the power flow measurement value in the node N41 by the PMU4 is initialized.

In Embodiment 1, the power flow estimation value in the node N41 computed in the state estimation calculation is a power flow which flows in the node N41 through from the node N11 to the circuit breaker CB11. The measurement value of the PMU4 is obtained by subtracting the power flow which is transmitted by the photovoltaic power generator facility G4 from the load power flow which flows out from the node N41 to the load in the PMU41.

In processing Step S43, the computation result in the state estimation calculating unit 10C, and the PMU data corresponding to the computation time of the state estimation value concerned are extracted from the database DB. Then, by using these values, a squared value ERR(i) of a difference between the estimation value and the measurement value by the PMU is computed.

In processing Step S44, comparison in magnitude between the squared value ERR(i) described above, and the buffer ERR_MAX for computing the maximum squared value of the power flow deviation is carried out. If ERR(i) is larger than the buffer ERR_MAX, then, ERR_MAX is updated. For the purpose of carrying out the update of ERR_MAX for the number N of all nodes in each of which the PMU is installed, the processing Steps S46, S47, the judgment and increment of the number of nodes are carried out.

Since in Embodiment 1, the node in which the PMU is installed is only the node N41, the number of target nodes is 1.

Since in the case where the evaluation for the entire number of PMU installation nodes is ended, the judgment result in processing Step S46 becomes No, the processing proceeds to processing Step S48.

In processing Step S48, ERR_MAX is compared with ERR_JUDGE as a predetermined judgment value. If ERR_MAX is larger than the predetermined judgment value, then, it is judged that the deviation is large and the reliability of the state estimation is low, and "1" is set to an output Out (processing Step S49). When ERR_MAX is smaller than the predetermined judgment value, it is judged that the deviation is small and thus the reliability of the state estimation is high, and "0" is set to the output Out (processing Step S40).

Since this judgment is carried out for the purpose of ensuring the stability of the generator, the judgment value ERR_JUDGE is desirably set smaller than a rated output of a group of generators G1, G2, G3 connected to the power system concerned.

Figure 5:
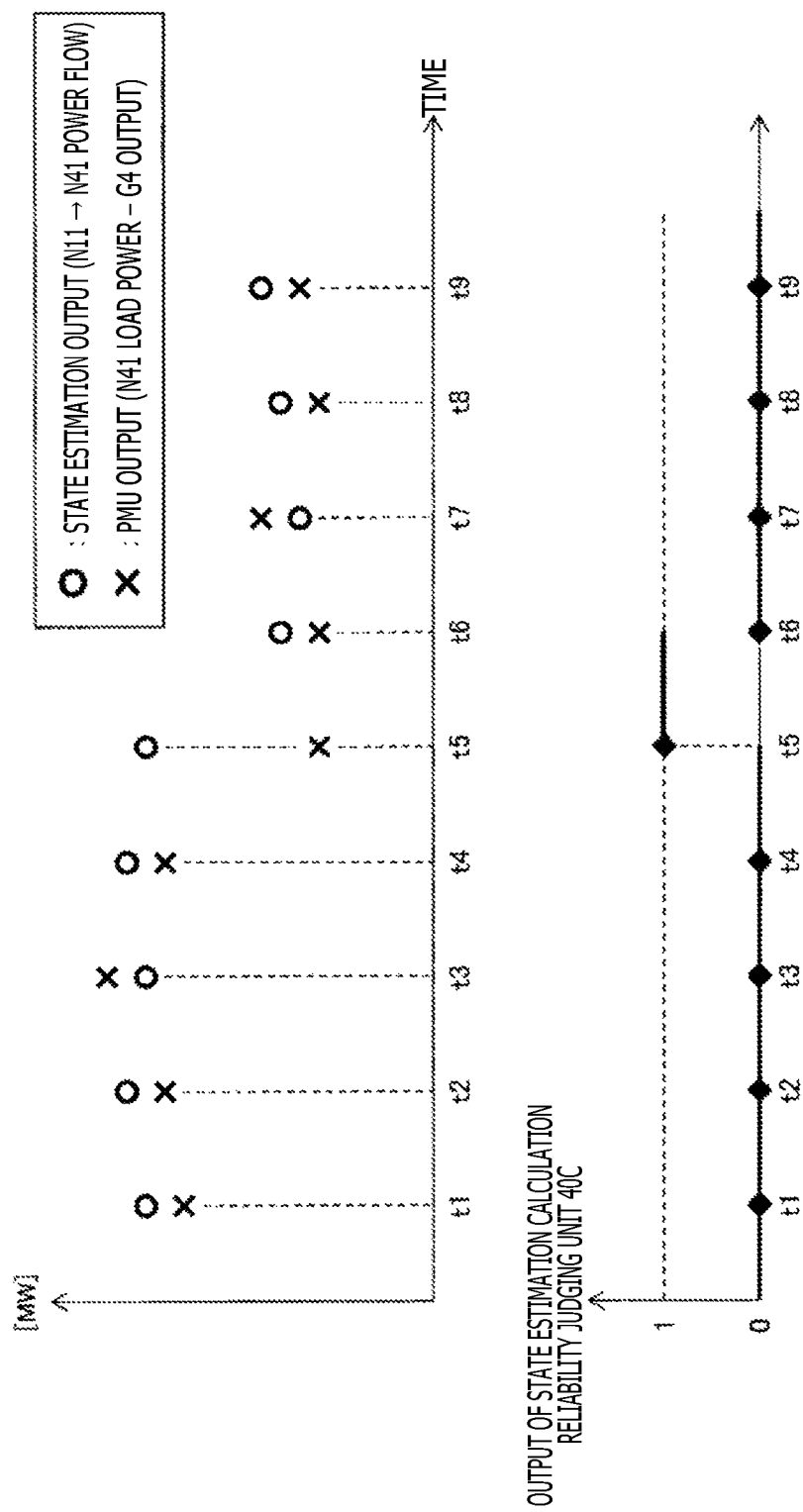
FIG. 5 is a graph depicting an example of a calculation result in the state estimation calculation reliability judging unit 40C of Embodiment 1.

FIG. 5 depicts an example of a calculation result in the state estimation calculation reliability judging unit 40C in Embodiment 1 of the present invention. In FIG. 5, a time change of the power flow (state estimation output: indicated by o) to the node N41 by the state estimation calculation, and the power flow (PMU4 output: indicated by x) to the node N41 computed by the measurement by the PMU4 are comparison-indicated in a graph in an upper stage. A time change of the output from the state estimation calculation reliability judging unit 40C is indicated in a graph in a lower stage.

In this case, it is supposed that the output from PMU4 indicated by x is a true value, and a level of the reliability is judged from the difference between the output from PMU 4 and the output value of the state estimation indicated by o. According to this comparison result, for a period of time from time t1 to time t4, the deviation of the state estimation result (o) and the PMU4 output (x) is equal to or smaller than a predetermined value, and thus the output from the state estimation calculation reliability judging unit 40C is maintained at "0" (the reliability is high).

At time t5, the deviation of the state estimation result (o) and the PMU4 output (x) is excessively large due to the reduction in the power flow or the like caused by the rapid increase in the solar radiation for the photovoltaic power generation system G4. Thus, the output from the state estimation calculation reliability judging unit 40C is changed from "0" to "1." The output from the photovoltaic power generation system G4 is rapidly increased, thereby leading to the situation in which the load enough to ensure the stability of each of the rotary type generators G1, G2, G3 is absent. Therefore, the adoption of the control table having the margin for the stability can prevent the dropout in large number of generators at the time of the grid fault.

If the increase in the output by the photovoltaic power generation system can be recognized, then, the stability can be ensured by another control such as the reduction of the mechanical input to the generator G1. Therefore, even if at the time t6, the control table is changed over to the control table TB2 with which the dropout of the generators can be reduced, then, the dropout of a large number of generators at the time of the power grid fault can be prevented.

In addition, the power system stabilizing system 1 according to Embodiment 1 of the present invention is provided with the display device 80. With the display device 80, the values of state variables of the nodes as the output from the state estimation calculating unit 10C, the output from the power grid fault judging unit 20C, and the output from the state estimation calculation reliability judging unit 40C can be displayed for the operator of the power system stabilizing system. In particular, the power system stabilizing system is provided with the means for displaying the state estimation calculation reliability judgment result as the feature of the present invention, thereby enabling the possibility of the occurrence of failure in the sensor used in the state estimation calculation, or the communication means for transmitting the sensor information to be suggested.

Although the power system stabilizing system of Embodiment 1 is provided with the two control tables TB1 and TB2, it may be provided with three or more control tables. In this case, a plurality of judgment values ERR_JUDGE based on which the difference between the power flow value, of the PMU connection node, is estimated by the state estimation calculating unit 10C, and the power flow computed by the PMU is judged is provided, and the control table is preferably selected in response to the judgment result.

According to the power system stabilizing system 1 having the configuration of FIG. 1, the opening instruction for the circuit breaker given by the switch control calculating unit 70C is issued to the circuit breaker the data associated with which is stored in the control tables TB1 and TB2 when the grid fault judging unit 20C confirms the grid fault occurrence. In this case, the output from the state estimation calculation reliability judging unit 40C before the occurrence of grid fault is reflected on the storage contents of the control tables TB1 and TB2. In the case where the reliability of the state calculation is high, the storage contents of the control table TB2 are reflected, while in the case where the reliability thereof is low, the storage contents of the control table TB1 are reflected.

For example, with respect to the power system exemplified in FIG. 6, the data associated with the switching states of the circuit breaker decided to have a relationship of the electrical output and the proper mechanical input which is decided in consideration of the fluctuations of the power flows in the portions, the phase angles of generators' terminal voltage, and the like when the grid fault has occurred with respect to a plurality of previously set supposed fault point is stored in the control table TB.

For example, in the case where the pre-supposed fault occurs in a point F1 of FIG. 6, in this example, a circuit breaker CB11 is opened as a circuit breaker in both ends including the fault point. The operation until now is the area of responsibility which the protection system of the existing power system carries out. However, the present invention further takes the power stability after generation of the failure with respect to the remaining power system for which the circuit breaker CB11 is opened to loss the load connected to a power source G4 and the power transmission lines L4 and L7 into consideration. From a viewpoint of the power stability of the remaining power system, the generator needs to be further disconnected. This case may correspond to case of only the generator G1, or this situation may not make the operation in time as long as up to a generator G2 is further disconnected. In the former case, the control table TB1, TB2 will specify the opening of the circuit breaker CB1, or the circuit breakers CB1 and CB2.

For this reason, the switch control calculating unit 70C specifies the circuit breaker which should be opening-controlled by referring to the contacts of specified any one of the control tables TB1 and TB2, including the information associated with the fault point, the type of fault, and further the information associated with the power flow. In addition, at this time, with respect to the storage contents within the control table TB2 used when the reliability is high, the circuit breaker is selected from a viewpoint of reduction of the number of generators which will be disconnected at the time of the power grid fault. With respect to the storage contents within the control table TB1 used when the reliability is low, the circuit breaker is selected from a viewpoint of that although there are many generators which will be disconnected at the time of the power grid fault, the disconnection operation having the margin for the transient stability of the generators left in the power system is realized.

From the above, according to Embodiment 1 of the present invention, in the case where the reliability of the state estimation calculation in the power system stabilizing system 1 is judged to be high, the influence range of grid fault at the time of the grid fault can be narrowed.

In addition, the state estimation calculation reliability judgment result is outputted to the display device, resulting in that the possibility of the failure generation in the sensor group used in the state estimation, or in the communication network through which the sensor group and the stabilization system are connected to each other can be suggested to the operator of the power system stabilizing system. This can further contribute to the power system stabilization operation.

Embodiment 2

A description will now be given with respect to a power system stabilizing system according to Embodiment 2 of the present invention with reference to FIG. 7 to FIG. 9. Embodiment 2 is different from Embodiment 1 in that means for, even in the case where the output from the state estimation calculating unit 10C is equal to the last value and the output from the PMU is different from the last value, judging the reliability of the state estimation calculation to be low to output "1" to the change-over switch SW is provided in the state estimation calculation reliability judging unit 40C.

In Embodiment 2, the same constituent elements as those described in Embodiment 1 are respectively assigned the same reference characters, and a repeated description thereof will be omitted here.

Figure 7:
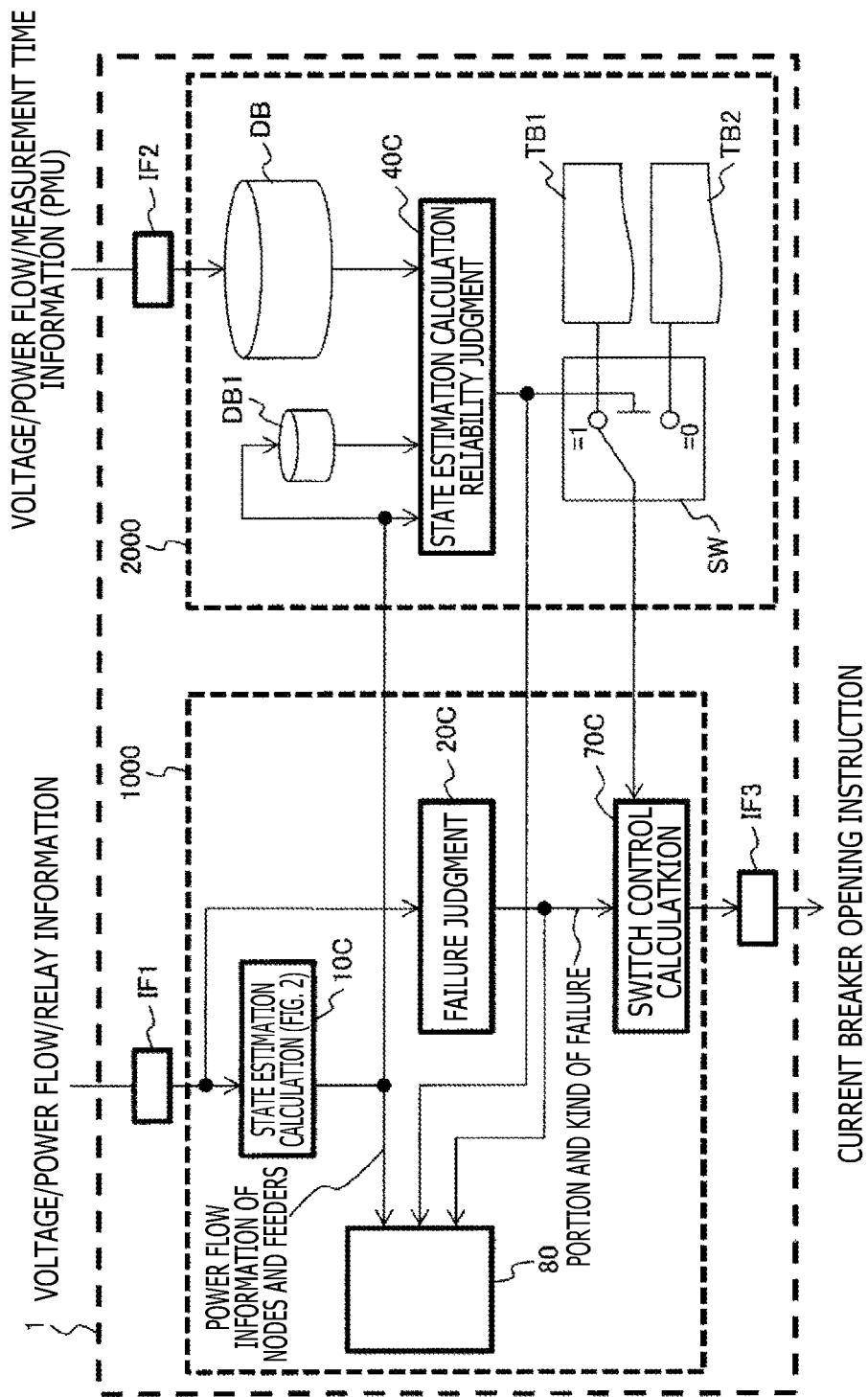
FIG. 7 is a block diagram depicting an example of a configuration of a power system stabilizing system according to Embodiment 2 of the present invention.

FIG. 7 depicts an example of a configuration of a power system stabilizing system according to Embodiment 2 of the present invention. Embodiment 2 is different from Embodiment 1 in that the power system stabilizing system 1 is provided with a database DB1 for preserving an output last value of the state estimation calculating unit 10C. The state estimation calculation reliability judging unit 40C receives as inputs thereof the output last value of the state estimation calculating unit 10C fetched out from the database DB1 in addition to the output from the state estimation calculating unit 10C, and the PMU output extracted from the database DB.

Figure 8:
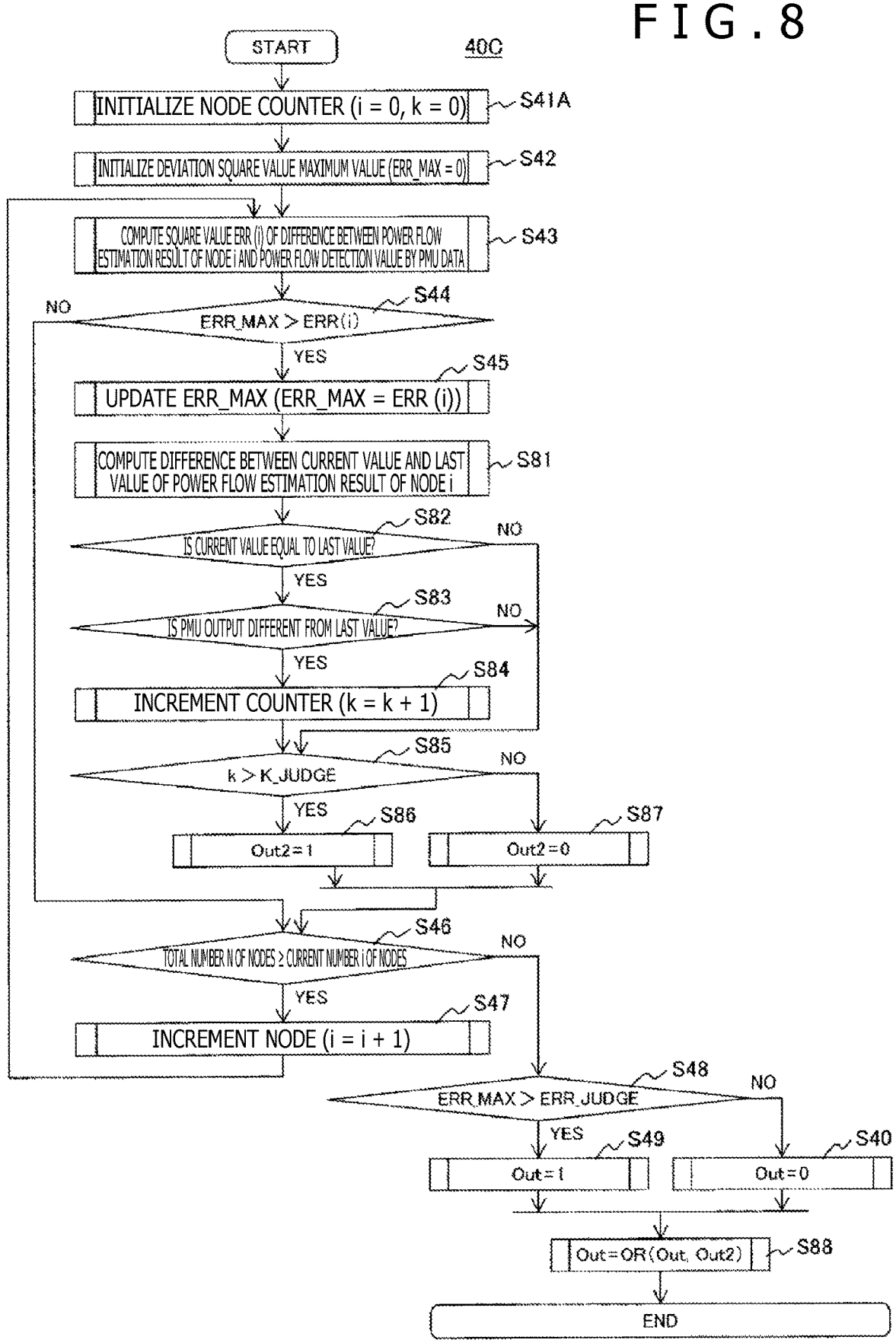
FIG. 8 is a flow chart depicting processing contents of the state estimation calculation reliability judging unit 40C of Embodiment 2.

FIG. 8 is a flow chart depicting processing contents of the state estimation calculation reliability judging unit 40C of Embodiment 2. FIG. 8 depicts processing corresponding to FIG. 4 of Embodiment 1.

Embodiment 2 is different from Embodiment 1 of FIG. 4 in that there is added processing for, in the case where the number of nodes in each of which the output from the state estimation calculation is compared with the last value, and as a result, the output from the state estimation calculation is equal to the last value and the PMU estimation value is different from the last value is equal to or larger than a predetermined value, judging that the state estimation calculation is low, thereby setting the output of the state estimation calculation reliability judging unit 40C to "1."

Specifically, processing Steps S81 to S88 are added. Moreover, although processing Step S1 of FIG. 4 is changed to processing Step S1A in FIG. 8, in a word, processing Step S1A carries out the initialization for the counter, and thus the initialization of a counter variable k of the number of nodes in each of which the output from the state estimation calculation is equal to the last value is merely added.

From this, the description from processing Step S1A to S45 is omitted, and processing Step in and after the processing Step S81 will now be described.

In processing Step S81, a difference between a current state estimation value inputted from the state estimation calculating unit 10C, and the last state estimation value received from the database DB1 is computed.

In processing Step S82, it is judged whether or not the difference is zero. In the case where the difference is zero, in processing Step S83, it is judged whether or not the output from the PMU is different from the last value. In the case where the output from the PMU is different from the last value, in processing Step S84, the counter k is incremented.

Although in Embodiment 2, the deviation from the last value is judged as zero, in consideration of the discretization or the influence of the noise, the deviation judgment in processing Step S82 may be carried out by using a relatively small predetermined value such as 5% or less of the normal power flow.

In processing Step S85, the counter k and the predetermined value K_JUDGE are compared with each other in magnitude. In the case where k is larger than K_JUDGE, in processing Step S85, "1" is substituted for Out2 as an intermediate output, and in any of other cases, "0" is substituted for Out2 in processing Step S86.

The above calculation is carried out for all the nodes connected to the PMU. A predetermined value K_JUDGE is an integral number equal to or smaller than the number of PMU connection nodes. Since in Embodiment 2, the node to which the PMU is connected is N41, N=K_JUDGE=1 is set.

In the case where there is a plurality of nodes to each of which the PMU is connected, even if the power flow information by the state estimation is not updated for all the nodes, when the greater part of the estimation power flow values are fixed, and the output from the PMU is fluctuated, it is possible to judge that the convergence fails. For example, the predetermined value K_JUDGE is set to about 80% of the node N, resulting in that the control table in the case where the greater part of the power flow estimation values are fixed can be changed.

In processing Step S88, a logical sum of a variable Out as the state estimation calculation reliability judgment result described in Embodiment 1, and an intermediate variable Out2 computed in processing Steps S81 to S87 added in Embodiment 2 is computed, and Out as the calculation result is outputted as a state estimation calculation reliability judgment result.

Even in the case where the state estimation calculation judgment calculation of Embodiment 2 proves that the output from the state estimation calculating unit 10C is equal to the last value, and the output from the PMU is different from the last value, it is judged that the reliability of the state estimation calculation is low, and thus 1 can be outputted to the change-over switch 50SW.

Figure 9:
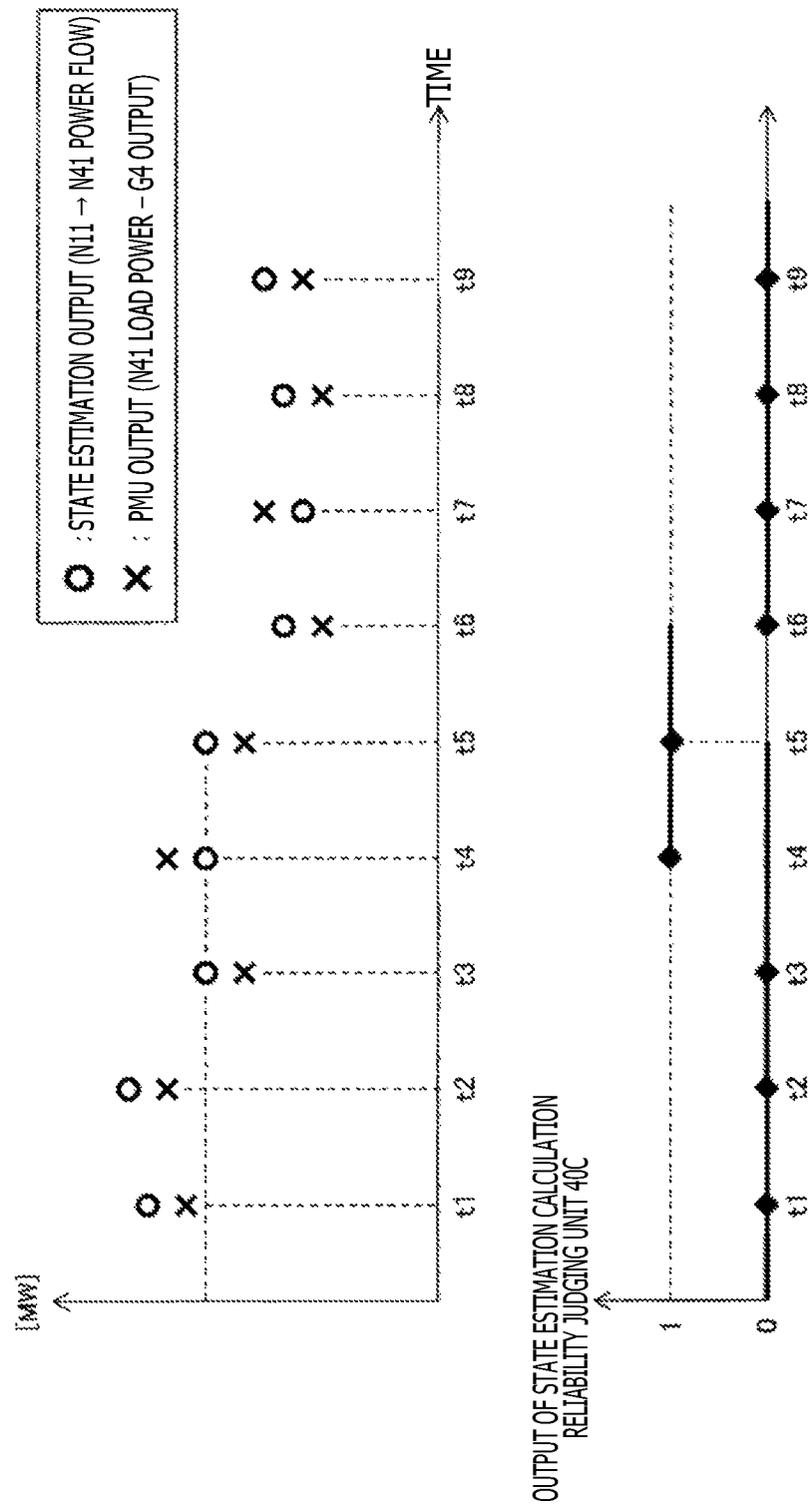
FIG. 9 is a graph depicting an example of a calculation result in the state estimation calculation reliability judging unit 40C of Embodiment 2.

FIG. 9 depicts an example of a calculation result in the state estimation calculation reliability judging unit 40C in Embodiment 2. In FIG. 9, a time change of the power flow (state estimation output: indicated by o) to the node N41 by the state estimation calculation, and the power flow (PMU4 output: indicated by x) to the node N41 computed by the measurement by the PMU4 are comparison-indicated in a graph in an upper stage. A time change of the output from the state estimation calculation reliability judging unit 40C is indicated in a graph in a lower stage.

In the case where the deviation of the state estimation output (o) and the PMU output (x) is smaller than the predetermined value, even when the state estimation calculation did not converge, in the power system stabilizing system of Example 1, the change-over of the control table could not be carried out.

On the other hand, in the power system stabilizing system of Embodiment 2, the state estimation output (o) and the PMU output (x) are compared with the respective last values. By adopting such a procedure, even if the deviation of the current values of the state estimation output (o) and the PMU output (x) is smaller than the judgment value, it becomes possible to judge that the state estimation calculation does not converge.

In the case where the state estimation fails to converge, this means that the power flow of the power system is not properly grasped. If in this situation, the control table having the small margin for the transient stability is used, then, it may be impossible to realize the supposed generator stabilization after the power grid fault, it is possible that the wide-area power failure is caused. In Embodiment 2, the control table is switched over to the control table having the high safety, resulting in that in the case where the power grid fault is generated, the control having the margin for the transient stability of the generator can be carried out, and thus the wide-area power failure can be avoided.

Although the power system stabilizing system of Embodiment 2 is provided with the two control tables TB1 and TB2, it may be provided with three or more control tables. In this case, a plurality of judgment values ERR_JUDGE based on which the difference between the power flow value, of the PMU connection node, estimated by the state estimation calculating unit 10C, and the power flow computed by the PMU is judged is provided, and the control table is preferably selected in response to the judgment result.

From the above, according to Embodiment 2, in the case where the reliability of the state estimation calculation in the power system stabilizing system 1 is judged to be high, the influence range of grid fault at the time of the grid fault can be narrowed.

In addition, the state estimation calculation reliability judgment result is outputted to the display device, resulting in that the possibility of the fault occurrence in the sensor group used in the state estimation, or in the communication network through which the sensor group and the stabilization system are connected to each other can be suggested to the operator of the power system stabilizing system. This can further contribute to the power system stabilization operation.

Moreover, according to Embodiment 2, since it is possible to detect that the state estimation calculation failures to converge, the control table having the high stability can be previously selected, and thus the wide-area power failure can be avoided.

DESCRIPTION OF REFERENCE CHARACTERS

1: power system stabilizing system, 1000: basic power system protecting system portion, 2000: PMU correction calculating portion, 10C: state estimation calculating unit, 20C: grid fault judging unit, 70C: switch control calculating unit, 80: display device, DB, DB1: database, 40C: state estimation calculation reliability judging unit, SW: change-over switch, TB1, TB2: control table, IF1, IF2, IF3: interface portion, G (G1, G2, G3): rotary type generator, G4: photovoltaic power generation system, Tr (Tr1, Tr2, Tr3, Tr5): transformer, N (N1, N2, N3, N5, N11, N21, N31, N41, N51, N61): node, CB (CB1, CB11, CB2, CB21, CB3, CB5, CB51, CB6): circuit breaker with sensor, L (L1, L2, L3, L4, L5, L6, L14, L15, L53, L52, L36, L26): power feeder, PMU4, PMU41: PMU

The invention claimed is:

1. A power system stabilizing system applied to a power system configured to include a plurality of feeders including circuit breakers, a plurality of nodes, a plurality of generators, and a plurality of loads, the power system stabilizing control system comprising:
a first interface portion for receiving as inputs thereof, every plurality of circuit breakers, information associated with a voltage and a power flow close to the plurality of circuit breakers concerned, and information associated with a protection relay for deciding an opening operation of the plurality of circuit breakers;
a second interface portion for receiving as an input thereof the formation associated with a voltage and a power flow containing information associated with measurement time measured in the power system;
state estimation calculating means for carrying out power flow state estimation calculation for the power system by using measurement information, associated with the voltage and the power flow, from the first interface;
grid fault judging means for judging a grid fault from the information associated with a protection relay from the first interface portion;
circuit breaker opening instruction computing means for computing and outputting a breaker opening instruction by using information in a control table;
reliability judging means for comparing power flow measurement information from the second interface portion, and power flow estimation information from the state estimation calculating means with each other to judge reliability of the state estimation calculation in the state estimation calculation means; and
the control table configured every judgment result of the reliability judging means, the circuit breaker which is to be newly opening-manipulated from a viewpoint of ensuring of power system stability after occurrence of a grid fault in the power system being decided in the control table,
wherein the circuit breaker opening command computing means gives a circuit breaker opening command for the circuit breaker by using the information in the control table selected in response to a judgment result of the reliability judging means.

2. The power system stabilizing control system according to claim 1, further comprising a first database for, with respect to the information associated with the voltage and the power flow containing the information associated with the measurement time from the second interface portion, preserving the information associated with the voltage and the power flow every measurement time,
wherein the reliability judging means compares an output from the state estimation calculating means, and an output from the first database with each other to judge the reliability of the state estimation calculation in the state estimation calculating means.

3. The power system stabilizing control system according to claim 2,
wherein a difference between the power flow measurement information and the power flow estimation information is computed by the reliability judging means, and when the difference is equal to or larger than a predetermined value, the control table for outputting an ON/disconnect command for the circuit breaker having a large margin for stability of the generator is selected.

4. The power system stabilizing control system according to claim 2, further comprising a second database for preserving a last computation value of the state estimation calculating means,
wherein the reliability judging means compares an output from the state estimation calculation in the state estimation calculating means with the last computation value, and in a case where output from the state estimation calculation is equal to the last value and the number of nodes in each of which the state estimation value is different from the last computation value is equal to or larger than a predetermined value, the control table for outputting the ON/disconnect command for the circuit breaker having a large margin for stability of the generator is selected.

5. The power system stabilizing system according to claim 2,
wherein a PMU installed in the power system is a phase measuring nit as a time synchronous type sensor using a GPS.

6. The power system stabilizing system according to claim 2, further comprising display means for displaying an output from the reliability judging means.

7. The power system stabilizing control system according to claim 1,
wherein a difference between the power flow measurement information and the power flow estimation information is computed by the reliability judging means, and when the difference is equal to or larger than a predetermined value, the control table for outputting an ON/disconnect command for the circuit breaker having a large margin for stability of the generator is selected.

8. The power system stabilizing control system according to claim 7, further comprising a second database for preserving a last computation value of the state estimation calculating means, wherein the reliability judging means compares an output from the state estimation calculation in the state estimation calculating means with the last computation value, and in a case where output from the state estimation calculation is equal to the last value and the number of nodes in each of which the state estimation value is different from the last computation value is equal to or larger than a predetermined value, the control table for outputting the ON/disconnect command for the circuit breaker having a large margin for stability of the generator is selected.

9. The power system stabilizing system according to claim 7, wherein a PMU installed in the power system is a phase measuring nit as a time synchronous type sensor using a GPS.

10. The power system stabilizing system according to claim 7, further comprising display means for displaying an output from the reliability judging means.

11. The power system stabilizing control system according to claim 1, further comprising a second database for preserving a last computation value of the state estimation calculating means, wherein the reliability judging means compares an output from the state estimation calculation in the state estimation calculating means with the last computation value, and in a case where output from the state estimation calculation is equal to the last value and the number of nodes in each of which the state estimation value is different from the last computation value is equal to or larger than a predetermined value, the control table for outputting the ON/disconnect command for the circuit breaker having a large margin for stability of the generator is selected.

12. The power system stabilizing system according to claim 1, wherein a PMU installed in the power system is a phase measuring nit as a time synchronous type sensor using a GPS.

13. The power system stabilizing system according to claim 1, further comprising display means for displaying an output from the reliability judging means.

14. A power system stabilizing method applied to a power system configured to include a plurality of feeders including circuit breakers, a plurality of nodes, a plurality of generators, and a plurality of loads, the system stabilizing method comprises:

a first step of obtaining as inputs thereof, every plurality of circuit breakers, information associated with a voltage and a power flow close to the plurality of circuit breakers concerned, and information associated with a protection relay for deciding an opening operation of the plurality of circuit breakers;

a second step of obtaining as an input thereof information associated with a voltage and a power flow containing information associated with measurement time measured in the power system;

a third step of carrying out power flow state estimation calculation for the power system by using measurement information, associated with the voltage and the power flow, in the first step; a fourth step of judging a grid fault from the information associated with the protection relay in the first step;

a sixth step of computing and outputting a breaker opening instruction by using information associated with a fifth step;

a seventh step of comparing power flow measurement information in the second step, and power flow estimation information in the third step with each other to judge reliability of the state estimation calculation in the third step; and the fifth step, configured every judgment result in the seventh step, of deciding the circuit breaker which is to be newly opening-manipulated from a viewpoint of ensuring of power system stability after occurrence of grid fault in the power system, wherein the sixth step gives the circuit breaker opening command for the circuit breaker, by using the information in the fifth step, selected in response to a judgment result in the seventh step.

15. The system stabilizing control method according to claim 14, further comprising an eighth step of, with respect to the information associated with the voltage and the power flow containing the information associated with the measurement time from the second interface portion, preserving the information associated with the voltage and the power flow every measurement time, wherein in the seventh step, an output in the third step and an output in the eighth step are compared with each other to judge the reliability of the state estimation calculation in the state estimation calculating means.

16. The system stabilizing control method according to claim 15, wherein in the seventh step, a difference between the power flow measurement information and the power flow estimation information is computed, and when the difference is equal to or larger than a predetermined value, the fifth step of outputting an ON/disconnect command for the circuit breaker having a large margin for stability of the generator is selected.

17. The system stabilizing control method according to claim 15, further comprising a ninth step of preserving the last computation value in the third step, wherein in the seventh step, an output of the state estimation calculation in the third step is compared with the last computation value, and in a case where an output of the state estimation calculation is equal to the last value and the number of nodes in each of which the state estimation value is different from the last computation value is equal to or larger than a predetermined value, the fifth step of outputting the ON/disconnect command for the circuit breaker having a large margin for stability of the generator is selected.

18. The system stabilizing control method according to claim 14, wherein in the seventh step, a difference between the power flow measurement information and the power flow estimation information is computed, and when the difference is equal to or larger than a predetermined value, the fifth step of outputting an ON/disconnect command for the circuit breaker having a large margin for stability of the generator is selected.

19. The system stabilizing control method according to claim 14, further comprising a ninth step of preserving the last computation value in the third step, wherein in the seventh step, an output of the state estimation calculation in the third step is compared with the last computation value, and in a case where an output of the state estimation calculation is equal to the last value and the number of nodes in each of which the state estimation value is different from the last computation value is equal to or larger than a predetermined value, the fifth step of outputting the ON/disconnect command for the circuit breaker having a large margin for stability of the generator is selected.

20. A system stabilizing method applied to a power system configured to include a plurality of feeders including circuit breakers, a plurality of nodes, a plurality of generators, and a plurality of loads,
- wherein a protection relay detects a grid fault by using an output from a first sensor installed close to the circuit breaker, thereby opening-controlling the circuit breaker, and the circuit breaker is opening-controlled by a power system stabilization output;
- a state estimation value of a power system obtained by using the first sensor output and a state detection value, of the power system, containing information associated with measurement time measured in the power system are compared with each other to judge reliability of the state estimation value;
- the circuit breaker which is to be newly cut off from a viewpoint of power system stability after occurrence of grid fault at a supposed grid fault point of the power system is stored, and the circuit breaker which is to be cut off every reliability judgment result of the state estimation value is stored; and
- at the time of occurrence of grid fault of the power system, a turn-off command for the circuit breaker which is selected in response to the reliability judgment result of the state estimation value so as to be newly cut off is set as the power system stabilization output.

* * * * *